United States Patent [19]

Alling et al.

[11] Patent Number: 5,187,345
[45] Date of Patent: Feb. 16, 1993

[54] METHOD OF WELDING RETAINER RINGS

[75] Inventors: Richard L. Alling; Richard W. Shepard, both of Torrington, Conn.

[73] Assignee: The Torrington Company, Torrington, Conn.

[21] Appl. No.: 796,189

[22] Filed: Nov. 22, 1991

[51] Int. Cl.⁵ .......................................... B23K 26/00
[52] U.S. Cl. ........................ 219/121.63; 219/121.64; 219/121.76
[58] Field of Search ................... 219/121.63, 121.64, 219/121.13, 121.14, 121.76, 121.78; 384/530

[56] References Cited

U.S. PATENT DOCUMENTS

| | | | |
|---|---|---|---|
| 3,313,582 | 4/1967 | Hubbell | 384/530 |
| 4,098,150 | 7/1978 | Penny et al. | 76/108 A |
| 4,658,110 | 4/1987 | Miller et al. | 219/121.63 |
| 4,661,677 | 4/1987 | LaRocca | 219/121.64 |
| 4,755,652 | 7/1988 | LaRocca | 219/121.64 |
| 4,821,386 | 4/1989 | Simon et al. | 29/149.5 |
| 4,970,365 | 11/1990 | Chalco | 219/121.63 |

Primary Examiner—C. L. Albritton
Attorney, Agent, or Firm—John C. Bigler

[57] ABSTRACT

A method of welding bearing retainer rings comprising the steps of: assembling two annular metal retainer rings and a plurality of bearing balls, each retainer ring having a plurality of ball pockets spaced about the ring, the ball pockets of one retainer ring being aligned with the ball pockets of the other retainer ring, a bearing ball being located within each ball pocket; applying pressure to the retainer rings; and then exposing at least a portion of the area of the retainer rings between adjacent ball pockets to a coherent high-energy beam of radiation thereby fusing the retainer rings together at a plurality of locations.

16 Claims, 1 Drawing Sheet

METHOD OF WELDING RETAINER RINGS

BACKGROUND OF THE INVENTION

This invention relates generally to the assembling of anti-friction bearing retainer rings and more particularly to bearing retainer rings fused together by welding.

There are two basic categories of ball bearing retainers, two piece assembled retainers and single piece wraparound retainers. A wraparound retainer is a single annular ring having a plurality of ball pockets for holding the bearing balls. Typically, the sides of the ball pockets extend outward into fingers which wrap around and retain the ball. A two piece retainer usually consists of two identical retainer halves, each half containing a plurality of ball pockets. The retainer halves are aligned with the ball pockets aligned with each other and then the two retainer halves are mechanically joined. One method of joining the retainer halves is riveting. Another is resistance welding or spot welding.

It is difficult to consistently obtain high quality resistance welds for the large quantities of mass produced bearing retainers. Two problems occur. The electric current used for resistance welding tends to follow the path of least resistance. This can result in melting in some area of the retainer other than the desired locations. This can cause arcing damage to the bearing raceway of the bearing ball surfaces. It is also possible for the current to be diffused to the extent that proper melting and welding do not occur. Multiple electrodes are typically used to weld the retainer halves together in a plurality of locations. If one electrode has a particularly low resistance path, it will tend to rob current from the other electrodes resulting in insufficient heating of the retainer in these other locations. Without sufficient heating, it is not possible to obtain an acceptable weld.

The second problem that can occur during resistance welding is due to wear of the electrodes. If the wearing is uneven, the current distribution among the electrodes will shift and not be uniform. Replacement of all the electrodes may be needed, even if only one is damaged or worn.

The foregoing illustrates limitations known to exist in present retainer ring welding methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method of welding bearing retainer rings comprising the steps of first assembling two annular metal retainer rings and a plurality of bearing balls, each retainer ring having a plurality of ball pockets spaced about the ring, the ball pockets of one retainer ring being aligned with the ball pockets of the other retainer ring, a bearing ball being located within each ball pocket. Second, applying pressure to the retainer rings; and then exposing at least a portion of the area of the retainer rings between adjacent ball pockets to a coherent high-energy beam of radiation thereby fusing the retainer rings together at a plurality of locations.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
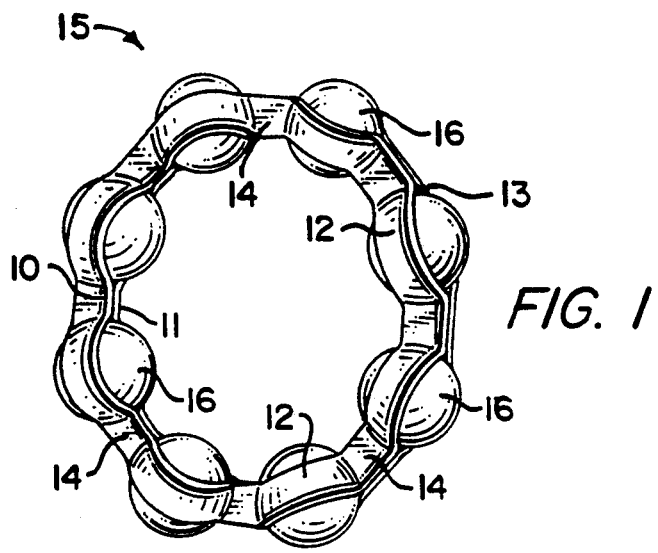
FIG. 1 illustrates a welded steel ball bearing retainer ring containing a complement of bearing balls.

FIG. 1 shows a retainer 15 comprised of a pair of retainer ring halves 10, 11 having a plurality of ball pockets 12, 13 spaced about each retainer ring half. The ball pockets 12 of one retainer ring half 10 are aligned with the ball pockets 13 of the other retainer ring half 11. A flat portion or bridge 14 is located between adjacent ball pockets. When the retainer 15 is assembled, the retainer ring bridges 14 are in abutting relationship. A complement of bearing balls 16 are retained in the ball pockets 12, 13. The retainer ring halves 10, 11 are welded together using a laser 50 to fuse the bridges 14 together.

Figure 2:
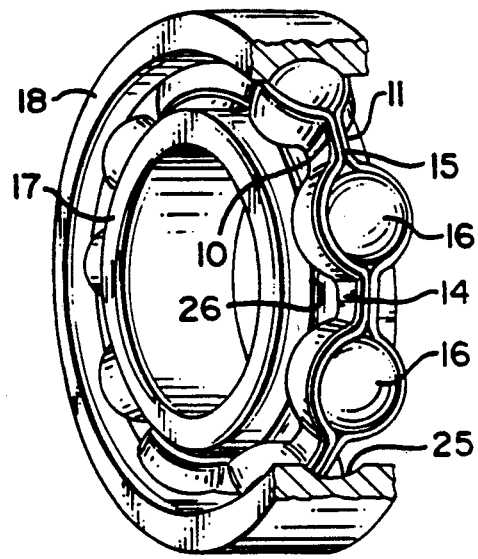
FIG. 2 is a fragment of a completed anti-friction bearing showing the positioning of the welded retainer ring between the inner and outer annular race members.

FIG. 2 shows a break-away view of a completed anti-friction bearing comprising an inner annular raceway member 17, an outer annular raceway member 18 and a complement of bearing balls 16 held within retainer 15 comprising two retainer ring halves 10, 11 laser welded together at their abutting bridges 14. The bearing balls 16 ride within ball groove 25 of the outer bearing ring 18 and ball groove 26 of the inner bearing ring 17.

Figure 3:
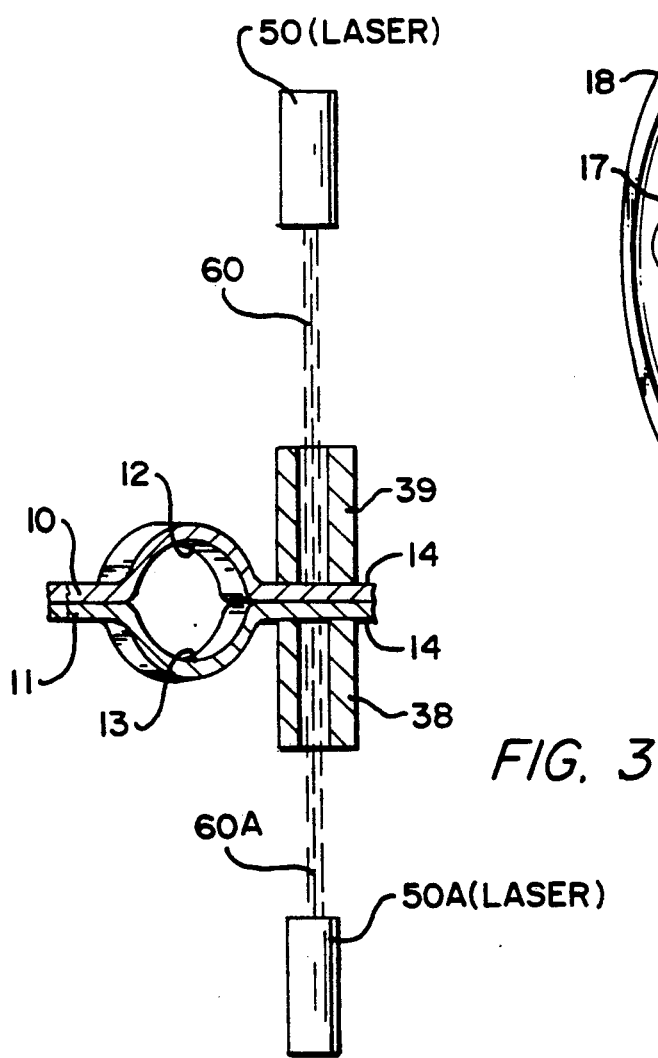
FIG. 3 depicts diagrammatically one embodiment of laser welding which may be employed in carrying out the invention.

In FIG. 3, a fragment of two retainer ring halves 10, 11 is shown comprising ball pockets 12, 13 disposed opposite each other with bridges 14 abutting one another. The bearing ball and the inner and outer races have been left out for clarity. To weld together the retainer bridges 14 pressure is applied to the bridges 14 using shields 38 and 39. While pressure is being applied, a coherent beam of high energy radiation 60 is produced by laser 50. The high energy of the beam 60 rapidly heats the metal in the bridges 14, melting and fusing the bridges 14 together.

Normally, the beam 60 is much smaller than the area of the bridges 14. If a larger area of weld is desired, the beam or the anti-friction bearing may be moved during welding to increase the area of fusing. The beam 60 may also be slightly out of focus to increase its diameter.

In addition to applying pressure to the bridges 14, shields 38, 39 also shield the portions of the anti-friction bearing other than the bridges 14 from any reflection of beam 60. Any reflected or stray beam may impart enough energy to cause melting or damage to other portions of the anti-friction bearing. Typically, the shields 38, 39 have a circular passage in the center of the shield. The circular passage allows the beam 60 to impinge on the bridges 14. The shields may contain passages of other shapes, such as rectangular or elongated ellipse depending upon the shape of the desired weld.

In addition to shielding the bearing from stray or reflected laser energy, the shields 38, 39 also capture any tiny splatters of molten metal which may occur.

Normally, the retainer 15 is welded within the assembled anti-friction bearing. For bearing applications where the retainer 15 can be inserted between the inner and outer races after welding, the retainer 15 can be welded prior to assembly.

In the preferred embodiment, the means used to apply pressure to the bridges 14 is the shields 38, 39. The means to apply pressure can be separate from the means used to shield the reflected beam. It is possible to hold the retainer bridges 14 together during welding by applying pressure to other portions of the retainer ring halves 10, 11, such as the ball pockets 12, 13.

FIG. 3 shows two lasers 50, 50A and two laser beams 60, 60A. The assembled retainer 15 can be welded with a single laser beam 60 impinging on only one bridge 14. The assembled retainer 15 can also be welded using two beams 60, 60A, each impinging one bridge 14 on each retainer ring half 10, 11. The beams 60, 60A can be generated by separate lasers 50, 50A as shown in FIG. 3 or by a single laser using known beam splitters (not shown). When the retainer bridges 14 are being welded from one side only, the shield 38 is not required. A support fixture (not shown) is used in its place.

One method of laser welding welds all the bridges 14 at the same time. Multiple beam splitters (not shown) are used to split the beam 60 into as many beams as are needed. The assembled retainer 15 can be welded from one side only or from both sides as discussed above.

A second method of laser welding welds a single pair of bridges at a time. The assembled anti-friction bearing is placed into a rotation device (not shown). A first bridge 14 is aligned with the laser beam 60. After the first bridge is welded, the remaining bridges are then sequentially welded.

Retainer rings have been welded together using a continuous $CO_2$ laser. The assembled anti-friction bearing was placed in a fixture which rotated the retainer allowing the retainer bridges to rotate into the laser beam. The laser beam was interrupted using a rotating wheel having a plurality of holes near its outer circumference. The holes allow the laser beam to pass through the wheel when a retainer bridge is aligned with the laser beam. The rotating wheel interrupts the laser beam whenever a retainer bridge is not aligned with the laser beam.

Although the initial testing was performed with a $CO_2$ laser, it is expected that a Nd:YAG laser will produce equivalent or superior results.

Having described the invention, what is claimed is:

1. A method of welding bearing retainer rings comprising the steps of:
   assembling two annular metal retainer rings and a plurality of bearing balls, each retainer ring having a plurality of ball pockets spaced about the ring, the ball pockets of one retainer ring being aligned with the ball pockets of the other retainer ring, a bearing ball being located within each ball pocket;
   applying pressure to the retainer rings; and
   exposing both retainer rings between adjacent ball pockets to a coherent high-energy beam of radiation thereby fusing the retainer rings together at a plurality of locations.

2. The method of claim 1 wherein the coherent high-energy beam is produced by a $CO_2$ laser beam.

3. The method of claim 1 wherein the coherent high-energy beam is produced by a Nd:YAG laser.

4. The method of claim 1 including the steps of:
   providing a shield to limit any reflection of the coherent high energy beam.

5. A method of welding bearing retainer rings comprising the steps of:
   assembling a bearing comprising two annular metal retainer rings, a plurality of bearing balls, an inner race and an outer race, each retainer ring having plurality of ball pockets spaced about the ring and having a flat area between adjacent ball pockets, each flat area defining a bridge, the ball pockets of one retainer ring, a bearing ball being located with each ball pocket, the two retainer rings being located between the inner race and outer race;
   applying pressure to the retainer ring bridges;
   exposing bridges of both retainer rings to a laser beam thereby fusing the retainer rings together at the retainer ring ridges; and
   providing a shield to limit any reflection of the laser beam to areas other than the retainer ring bridges.

6. The method of claim 5 wherein all retainer ring bridges are simultaneously exposed to laser beams.

7. The method of claim 5 wherein the retainer ring bridges are sequentially exposed to the laser beam one abutting pair of retainer bridges at a time.

8. A method of welding bearing retainer rings comprising the steps of:
   assembling a bearing comprising two annular metal retainer rings, a plurality of bearing balls, an inner race and an outer race, each retainer ring having a plurality of ball pockets spaced about the ring and having a flat area between adjacent ball pockets, each flat area defining a bridge, the ball pockets of one retainer ring being aligned with the ball pockets of the other retainer ring, a bearing ball being located within each ball pocket, the two retainer rings being located between the inner race and outer race;
   applying pressure to the retainer ring bridges;
   exposing bridges of both retainer rings to a laser beam thereby fusing the retainer rings together at the retainer ring bridges; and
   providing a shield to limit any reflection of the laser beam to areas other than the retainer ring bridges, the shield including the means to apply pressure to the retainer ring bridges.

9. The method of claim 8 wherein all the retainer ring bridges are simultaneously exposed to laser beams.

10. The method of claim 8 wherein the retainer ring bridges are sequentially exposed to at least one laser beam, one abutting pair of retainer bridges at a time.

11. The method of claim 8 wherein the laser beam is produced by a $CO_2$ laser.

12. The method of claim 8 wherein the laser beam is produced by a Nd:YAG laser.

13. A system for creating a welded bearing retainer ring, comprising:
   two annular metal retainer rings and a plurality of bearing balls, each retainer ring having a plurality of ball pockets spaced about the ring, the ball pockets of one retainer ring being aligned with the ball pockets of the other retainer ring, a bearing ball being located within each ball pocket;
   pressure means for applying pressure to the retainer rings in the area between the ball pockets; and
   laser means for exposing both retainer rings between adjacent ball pockets to a coherent high energy beam of radiation to fuse together the retainer rings at a plurality of locations.

14. System according to claim 13, wherein said laser means for exposing comprises a CO2 laser.

15. The system according to claim 13, further comprising shielding means for limiting any reflection of the coherent high energy beam.

16. The System according to claim 13, wherein said laser means comprises a Nd:YAG laser.

* * * * *